United States Patent
Iwase

(10) Patent No.: US 9,698,400 B2
(45) Date of Patent: Jul. 4, 2017

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Kosuke Iwase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 14/506,319

(22) Filed: Oct. 3, 2014

(65) Prior Publication Data

US 2015/0099158 A1  Apr. 9, 2015

(30) Foreign Application Priority Data

Oct. 4, 2013  (JP) .................. 2013-209306

(51) Int. Cl.
*H01M 2/16* (2006.01)
*H01M 2/34* (2006.01)
*H01M 4/36* (2006.01)
*H01M 10/0525* (2010.01)

(52) U.S. Cl.
CPC ....... *H01M 2/1686* (2013.01); *H01M 2/1613* (2013.01); *H01M 2/1646* (2013.01); *H01M 2/1673* (2013.01); *H01M 2/347* (2013.01); *H01M 2/348* (2013.01); *H01M 4/366* (2013.01); *H01M 10/0525* (2013.01); *H01M 2200/10* (2013.01)

(58) Field of Classification Search
CPC .......... H01M 2/145; H01M 2004/027; H01M 2004/028; H01M 2300/0017; H01M 2220/30; H01M 10/0436; H01M 10/052; H01M 2/1686; H01M 2/1613; H01M 2/1646; H01M 2/1673; H01M 2/347; H01M 2/348; H01M 4/366; H01M 10/0525; H01M 2200/10
USPC .......................................... 429/144
See application file for complete search history.

(56) References Cited

U.S. PATENT DOCUMENTS

| 2008/0038631 | A1* | 2/2008 | Nakura | H01M 2/145 |
| | | | | 429/144 |
| 2010/0178544 | A1 | 7/2010 | Nishikawa | |
| 2013/0244082 | A1* | 9/2013 | Lee | H01M 2/1646 |
| | | | | 429/145 |

FOREIGN PATENT DOCUMENTS

WO   WO 2008/149895 A1   12/2008

* cited by examiner

*Primary Examiner* — Nicholas P D'Aniello
*Assistant Examiner* — Abibatu Ojo-Amoo
(74) *Attorney, Agent, or Firm* — Oliff PLC

(57) ABSTRACT

The present invention provides a non-aqueous electrolyte secondary battery having an electrode body formed by stacking a positive electrode, a separator and a negative electrode and a non-aqueous electrolyte. The separator has a separator substrate made and a first porous heat resistance layer formed on a surface of the substrate on a side facing the positive electrode. A surface of the negative electrode on a side facing the separator is formed by a second porous heat resistance layer. The first and second porous heat resistance layers satisfy: (1) an average thickness of the first porous heat resistance layer is greater than that of the second porous heat resistance layer; (2) an average particle diameter of an inorganic filler contained in the first porous heat resistance layer is greater than that of an inorganic filler contained in the second porous heat resistance layer.

12 Claims, 6 Drawing Sheets

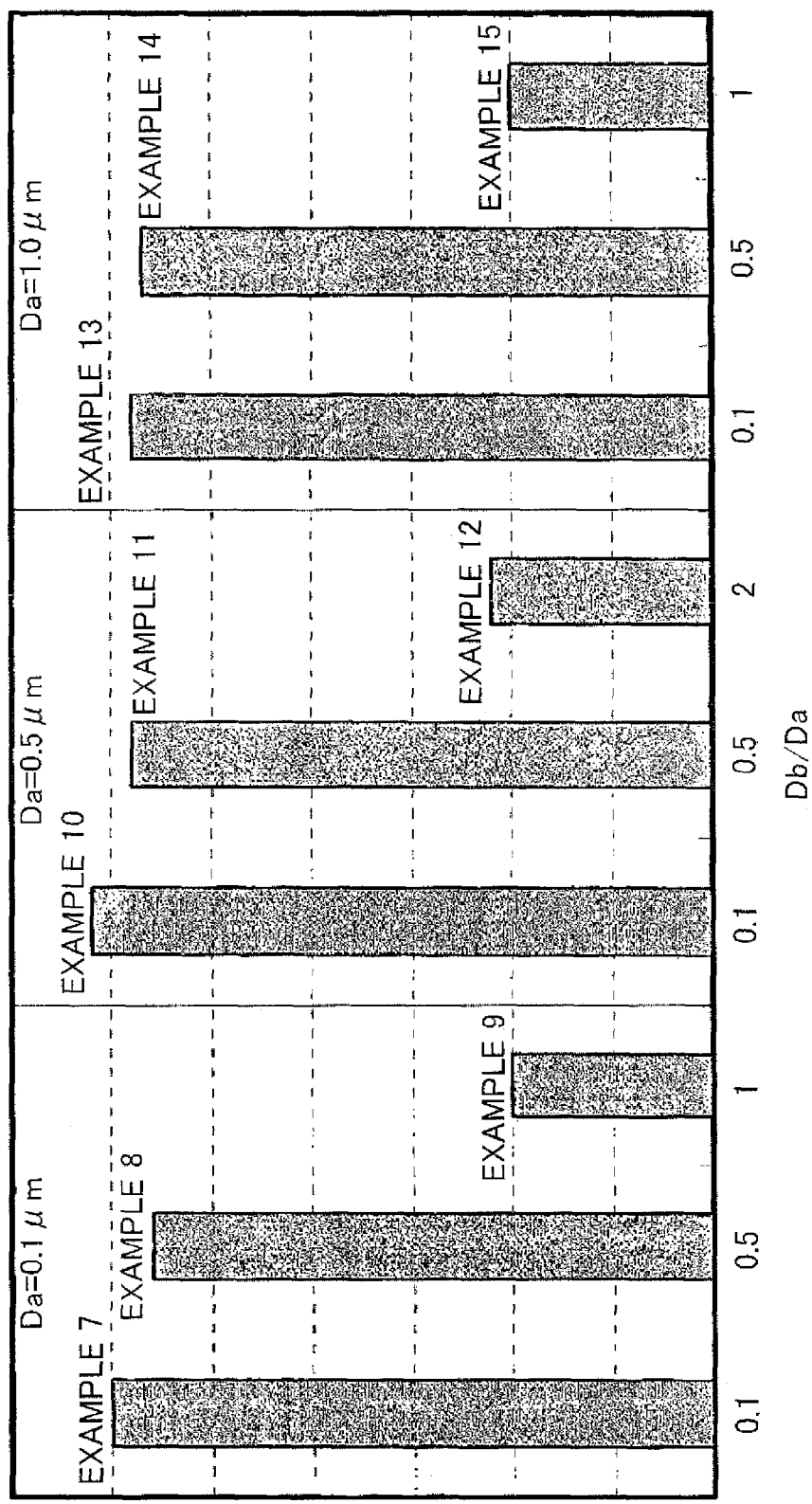

NON-AQUEOUS ELECTROLYTE SECONDARY BATTERY

INCORPORATION BY REFERENCE

The disclosure of Japanese Patent Application No. 2013-209306 filed on Oct. 4, 2013 including the specification, drawings and abstract is incorporated herein by reference in its entirety.

BACKGROUND OF THE INVENTION

1. Field of the Invention

The present invention relates to a non-aqueous electrolyte secondary battery. Specifically, the present invention relates to a non-aqueous electrolyte secondary battery provided with a porous heat resistance layer on surfaces of a separator and a negative electrode.

2. Description of Related Art

Non-aqueous electrolyte secondary batteries such as lithium ion secondary batteries and nickel hydrogen batteries are recently used as so-called portable power sources for personal computers and portable terminals and vehicle driving power sources. In particular, lithium ion secondary batteries that are lightweight and can afford high energy density are preferably used as high output driving power sources of vehicles such as electric cars and hybrid cars.

In a typical structure of a non-aqueous electrolyte secondary battery, an electrode body in which a positive electrode and a negative electrode face each other through a separator is housed in a battery case together with a non-aqueous electrolyte. The separator is generally formed of a porous sheet of a resin such as polyolefin and has a function of electrically insulating the positive electrode and negative electrode, a function of holding the non-aqueous electrolyte, and a shut-down function (i.e., a function such that when the inside of the battery is overheated to reach a specified temperature range (typically, a softening temperature of the separator), the separator is softened, and a conduction path of charge carriers is shut down). In addition, the separator is also required to have heat-resistance (endurance) of a specified level. That is, even when the inside of the battery is overheated to the softening temperature of the separator or higher and the separator is subject to thermal shrinkage or breakage, it is necessary to prevent the internal short circuit from occurring. As means for responding to such a requirement, a separator in which a porous heat resistance layer (HRL) is formed on a surface of a porous sheet made of resin has been proposed. The porous heat resistance layer is typically mainly formed of particles of an inorganic compound (inorganic filler) and has high heat resistance and insulation property (nonconductive property). In International Publication No. 2008/149895, for example, a separator in which a porous heat resistance layer is formed on both surfaces of a polyolefin microporous membrane is disclosed.

SUMMARY OF THE INVENTION

When a non-aqueous electrolyte secondary battery is produced, a foreign matter (typically metallic foreign matter such as copper and iron) may enter from outside (for example, constituent members of an equipment used to produce an electrode). In a case that the foreign matter is present in the vicinity of a surface of the electrode, for example, the separator may be broken (ruptured) and small internal short circuit may occur in the battery, thereby deteriorating battery performance (e.g., a decrease in battery voltage). According to study of the present inventor, in the technology disclosed in International Publication No. 2008/149895, in particular when the foreign matter has a sharp (pointed) tip, it may be difficult to deal with the aforementioned phenomenon.

The present invention provides a non-aqueous electrolyte secondary battery in which the internal short circuit caused by the invading foreign matter is less likely to occur and which is excellent in the reliability and endurance.

According to the study of the present inventor, it was found that a stress higher than that in its peripheral portions may be applied to the foreign matter present in the vicinity of the surface of the electrode, for example, during preparation of the electrode body or during the use thereof (during charge/discharge). Further, it was determined that the separator may be broken by such a stress, causing occurrence of the internal short circuit. Therefore, the present inventor considered to reduce the stress which may be applied to the foreign matter to reduce occurrence of the internal short circuit, and after further careful and repeated study, the present inventor found out a method and a structure which may solve the aforementioned problem and completed the present invention.

Aspect of the present invention relates to a non-aqueous electrolyte secondary battery including an electrode body and a non-aqueous electrolyte. The electrode body is formed of a positive electrode and a negative electrode facing each other through a separator. The separator has a separator substrate made of resin and a first porous heat resistance layer, and the first porous heat resistance layer contains an inorganic filler and is formed on a surface of the separator substrate on a side facing the positive electrode. A surface of the negative electrode on a side facing the separator is formed by a second porous heat resistance layer containing an inorganic filler. Moreover, the first and second porous heat resistance layers satisfy each of the following conditions: an average thickness $T_a$ of the first porous heat resistance layer is greater than an average thickness $T_b$ of the second porous heat resistance layer (i.e., $T_a > T_b$); and an average particle diameter $D_a$ of the inorganic filler contained in the first porous heat resistance layer is greater than an average particle diameter $D_b$ of the inorganic filler contained in the second porous heat resistance layer (i.e., $D_a > D_b$).

By providing the porous heat resistance layers with the aforementioned properties on the surface of the separator on the side facing the positive electrode and on the surface of the negative electrode on the side facing the separator, the invading foreign matter can be prevented from penetrating through the separator and causing the internal short circuit. Such a case will be explained in detail with reference to FIG. 1. That is, as schematically shown in FIG. 1, by providing porous heat resistance layers 30A and 30B with higher shape maintenance (higher mechanical strength) on both sides of a separator substrate 42 made of resin, and sandwiching the separator substrate 42 having relatively high flexibility, the stress that may be applied to the invading foreign matter 1 can be well absorbed and reduced. Additionally, different from the related art of providing porous heat resistance layers on both sides of a separator substrate, by providing the porous heat resistance layer 30A on a surface of the separator substrate 42 and providing the porous heat resistance layer 30B on a surface of the negative electrode 21, an extremely thin non-aqueous electrolyte layer 2 can be provided between the separator substrate 42 and the porous heat resistance layer 30B. Accordingly, the aforementioned reduced stress can be well dispersed, and the bending and deformation of the negative electrode 21 can be suppressed.

Furthermore, even in a case that the aforementioned reduced stress makes the negative electrode 21 a little warped and bended, for example, peeling (slipping) of the active material from the negative electrode 21 can also be suppressed. Therefore, with this configuration, a non-aqueous electrolyte secondary battery which may combine excellent battery performance and reliability (resistance against the foreign matter which may be contained in the battery) at a high level can be achieved. Furthermore, the "non-aqueous electrolyte secondary battery" in this Specification refers to a secondary battery having a non-aqueous electrolyte (typically a non-aqueous electrolyte solution in which a support electrolyte is contained in a non-aqueous solvent).

The thicknesses ($T_a$, $T_b$) of the aforementioned porous heat resistance layers and the average particle diameters ($D_a$, $D_b$) of the inorganic fillers contained in the porous heat resistance layers may be determined, for example, by analyzing an image observed through a conventional electron microscope (a scanning type or a transmission type may be used). Specifically, at first, after a specimen (a separator and/or a negative electrode) for measurement provided with porous heat resistance layers is embedded with a proper resin (preferably thermosetting resin), it is cut off (or grinded), with a cross-section exposed. Next, an electron microscope (e.g., SEM: Scanning Electron Microscope) is used to observe the cross-section. In the obtained observation image, the porous heat resistance layers are identified from the shade of the tone and the like, for instance. The thicknesses ($T_a$ and $T_b$) of the porous heat resistance layers may be grasped by measuring thicknesses in a plurality of positions (usually at least 10 positions (e.g., 20 positions or more) of the porous heat resistance layers and calculating their arithmetic average value. In addition, the average particle diameters ($D_a$ and $D_b$) of the inorganic fillers may be grasped by measuring particle diameters of at least 30 particles or more (e.g., 30~100 particles) of the inorganic fillers and calculating their arithmetic average value.

A ratio ($T_b/T_a$) of the average thickness $T_b$ of the second porous heat resistance layer to the average thickness $T_a$ of the first porous heat resistance layer may be 0.2 or more and 0.3 or less. In other words, the average thickness $T_a$ of the first porous heat resistance layer may be about 3~5 times the average thickness $T_b$ of the second porous heat resistance layer. With this configuration, the internal short circuit caused by invasion of the foreign matter into the battery can be better suppressed. Even if a sharp (tiny) foreign matter, for example, with a tip R (or diameter Φ) of 30 μm or less (typically 15 μm~30 μm) enters, it is difficult to break the separator, which exerts high endurance. Hence, the effect of the present invention can be exerted at a higher level.

The average thickness of the first porous heat resistance layer may be 5 μm or more and 20 μm or less (preferably 5 μm or more and 15 μm or less). By setting the average thickness of the first porous heat resistance layer to 5 μm or more, the internal short circuit caused by invasion of the foreign matter into the battery can be further suppressed. Moreover, thermal stability and mechanical strength (shape stability) of the separator can be further improved. Furthermore, by setting the average thickness of the first porous heat resistance layer to 20 μm or less (preferably 15 μm or less), a high ion permeability can be ensured and the battery resistance can be reduced. Thereby, high battery performance and reliability (resistance against foreign matter which may be contained in the battery) can be combined at a higher level.

A ratio ($D_b/D_a$) of the average particle diameter $D_b$ of the inorganic filler contained in the second porous heat resistance layer to the average particle diameter $D_a$ of the inorganic filler contained in the first porous heat resistance layer may be 0.1 or more and 0.5 or less. In other words, the inorganic filler contained in the first porous heat resistance layer preferably has a size 2~10 times that of the inorganic filler contained in the second porous heat resistance layer. With this configuration, the stress which may be applied to the foreign matter can be better dispersed and reduced, and thus deformation of the negative electrode can be well suppressed. Hence, the effect of the present invention can be exerted at a higher level.

The average particle diameter $D_a$ of the inorganic filler contained in the first porous heat resistance layer may be 0.1 μm or more and 5 μm or less. Thereby, the stress which may be applied to the foreign matter can be better reduced, and the effect of the present invention can be exerted at a higher level.

The average thickness of the separator substrate may be 30 μm or less (typically 15 μm or more and 30 μm or less). By setting the thickness of the separator in the aforementioned range, the internal short circuit caused by invasion of the foreign matter into the battery can be further suppressed. Moreover, ion permeability becomes better, and the battery resistance can be reduced. Thereby, a battery which is excellent in battery performance and in which the internal short circuit (breakage of the separator) is less likely to occur, may be achieved.

The separator substrate may essentially consist of polyolefin porous resin (typically polyethylene resin and/or polypropylene resin). The polyolefin porous resin sheet has a shut-down temperature of approximately 80° C.~140° C., which is sufficiently lower than the heat resistance temperature (typically approximately 200° C. or higher) of the battery, thereby the shut-down function can be exerted at an appropriate time. Hence, a battery with higher reliability can be achieved.

As described above, the aforementioned non-aqueous electrolyte secondary battery (e.g., a lithium ion secondary battery) may well maintain battery performance and exert a high reliability even if a foreign matter enters. For example, the input/output density is high, and the endurance is excellent. Therefore, by taking advantage of the characteristics, such a battery can be well used as, e.g., a power source (driving power supply) of a vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a graph showing a relationship between a ratio (Db/Da) of average particle diameters of the inorganic fillers and short circuit strength.

DETAILED DESCRIPTION OF EMBODIMENTS

Hereinafter, preferable embodiments of the present invention will be described with reference to the drawings. In the following accompanying drawings, the like members and regions that play the same roles are denoted with like numerals. Further, a dimensional relationship (length, width, thickness and the like) in each of drawings does not reflect an actual dimensional relationship. Moreover, items that are necessary for carrying out the present invention other than items particularly referred to in this Specification may be grasped as design matters of a person skilled in the art based on the related art in the concerned field. The present invention may be carried out based on contents disclosed in this Specification and common technical knowledge in the concerned field.

Although not particularly intended to limit, hereinafter, as a schematic structure of a non-aqueous electrolyte secondary battery according to one embodiment of the present invention, a non-aqueous electrolyte secondary battery in which a flatly rolled electrode body and a non-aqueous electrolyte are housed in a flat rectangular parallelepiped (box shaped) container will be described in detail.

Figure 1:
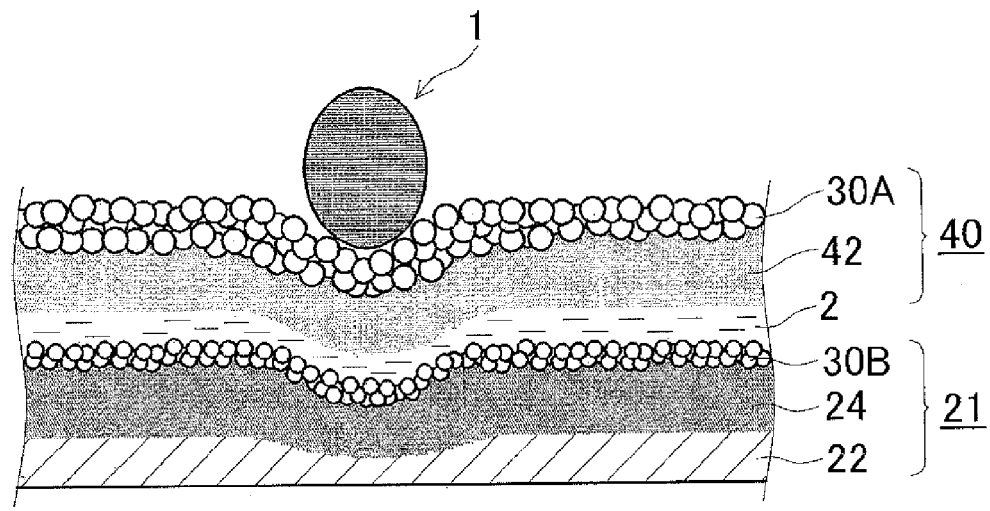
FIG. 1 is a schematic diagram that shows a function and an effect in foreign matter invasion.
Figure 2:
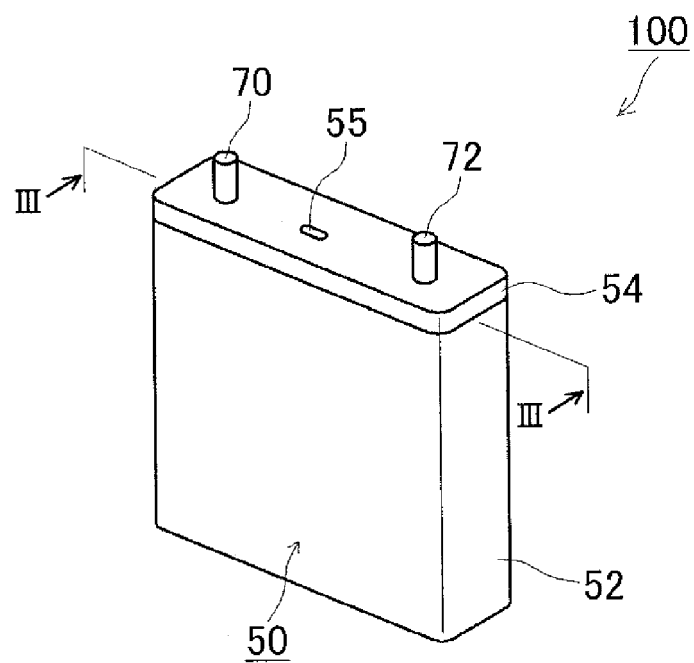
FIG. 2 is a perspective view that schematically shows an external shape of a non-aqueous electrolyte secondary battery according to one embodiment.
Figure 3:
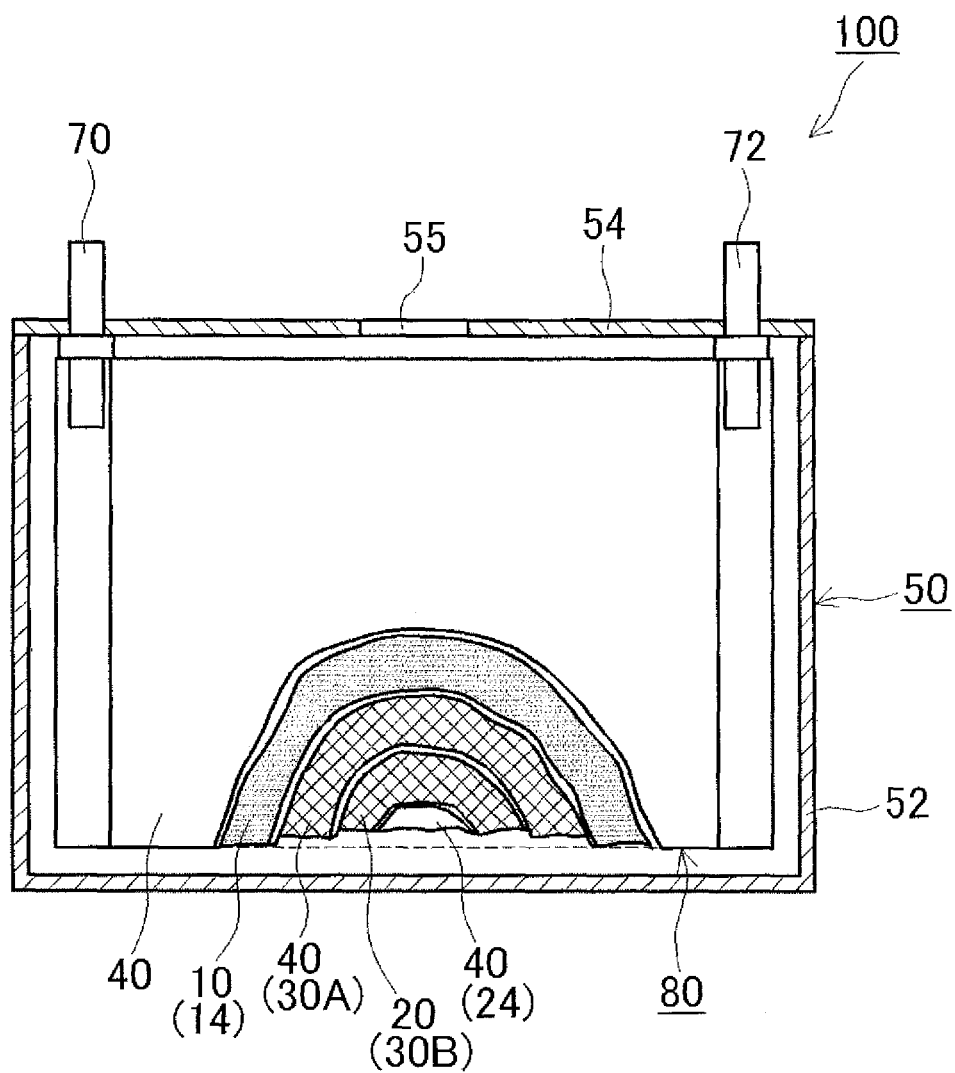
FIG. 3 is a cross-sectional view taken along a III-III line of FIG. 2.

A schematic structure of a non-aqueous electrolyte secondary battery according to an embodiment of the present invention is shown in FIG. 2 and FIG. 3. FIG. 2 is a perspective view that schematically shows an external shape of a non-aqueous electrolyte secondary battery 100. FIG. 3 is a schematic view that shows a cross-sectional structure along a III-III line of the non-aqueous electrolyte secondary battery 100 shown in FIG. 2.

As shown in FIG. 2 and FIG. 3, the non-aqueous electrolyte secondary battery 100 according to the present embodiment has a rolled electrode body 80 and a battery case (outer container) 50. The battery case 50 includes a flat rectangular parallelepiped (cuboid) battery case body 52 having an opening at an upper end, and a cap body 54 that closes the opening thereof. On a top surface of the battery case 50 (that is, the cap body 54), a positive electrode terminal 70 (for external connection) electrically connected to the positive electrode of the rolled electrode body 80 and a negative electrode terminal 72 electrically connected to the negative electrode of the rolled electrode body 80 are provided. Furthermore, the cap body 54 is provided with, in the same manner as the battery case of the non-aqueous electrolyte secondary battery of the related art, a safety valve 55 for discharging a gas generated inside the battery case 50 to the outside of the case 50. As shown in FIG. 3, a long sheeted positive electrode (positive electrode sheet) 10 and a long sheeted negative electrode (negative electrode sheet 20) are flatly rolled with two long sheeted separators (separator sheet 40) sandwiched therebetween, to form a electrode body (rolled electrode body) 80, and the electrode body 80 is housed inside the battery case 50 together with a non-aqueous electrolyte (not shown).

Figure 4:
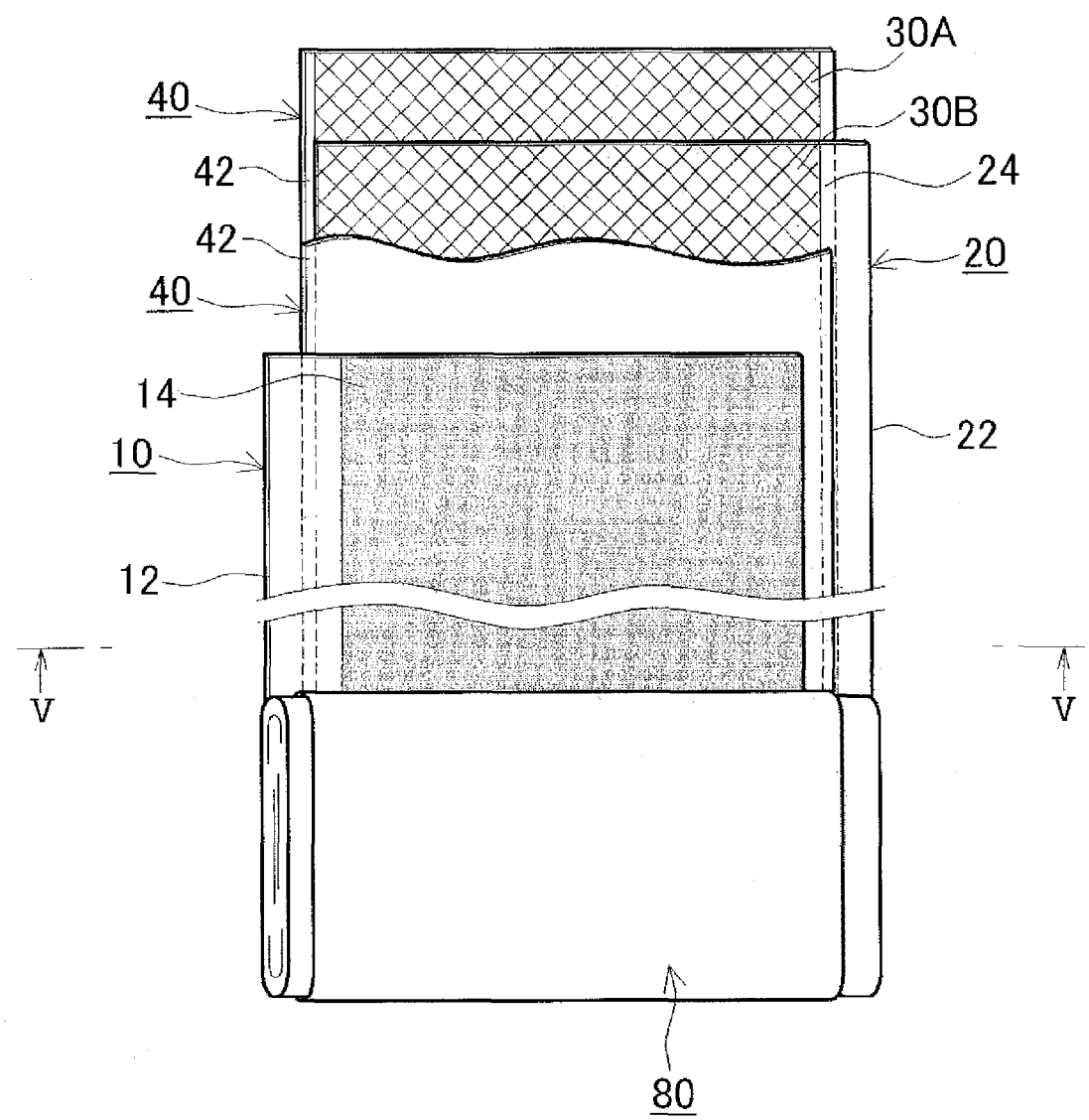
FIG. 4 is a schematic diagram that shows a structure of a rolled electrode body of FIG. 3.
Figure 5:
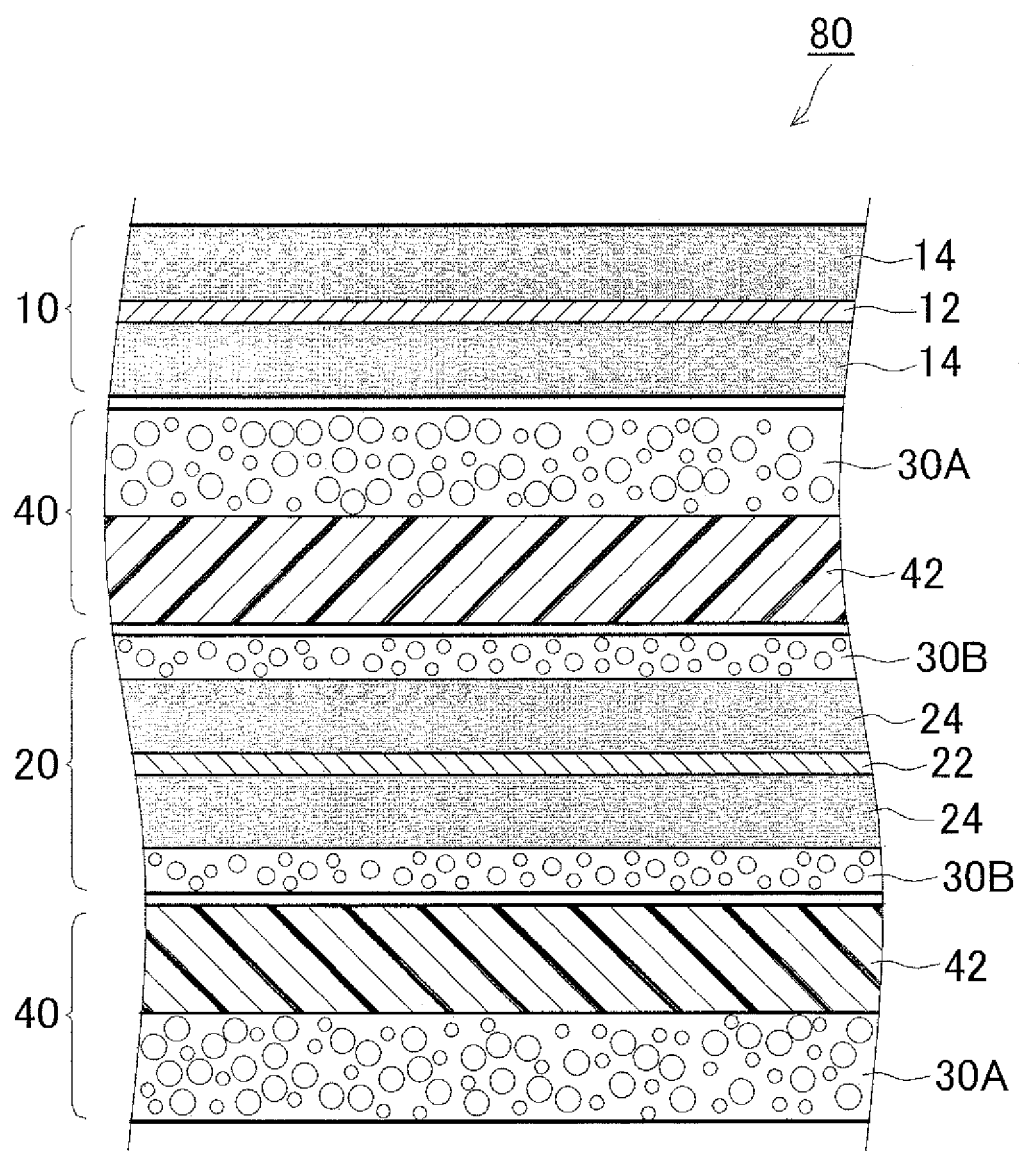
FIG. 5 is cross-sectional view taken along a V-V line of FIG. 4.

<<Rolled electrode body 80>> FIG. 4 is a partially cut-away perspective view that schematically shows the structure of the rolled electrode body 80 as shown in FIG. 3. FIG. 5 is a schematic view showing a cross-sectional structure of the rolled electrode body 80 shown in FIG. 4 taken along a V-V line. As shown in FIG. 4 and FIG. 5, the rolled electrode body 80 according to the present embodiment has a flat long-strip sheet structure in the stage prior to the assembly of the rolled electrode body 80. The rolled electrode body 80 is formed into a flat shape by sequentially stacking the positive electrode sheet 10, the separator sheet 40, the negative electrode sheet 20, and the separator sheet 40 to form a stack, rolling the stack in the longitudinal direction, and then pressing the obtained rolled body from a lateral direction. In such a flat rolled electrode body 80, it is particularly necessary to prevent the displacement and buckling from occurring. In addition, since a surface pressure tends to be higher in a corner portion than a straight line portion in the rolled electrode body 80, it can be said that the internal short circuit caused by invasion of foreign matter is prone to occur at the corner portion. Therefore, an application of the present invention that may improve the endurance is particularly preferable. Furthermore, at both ends in the rolling axis direction of the rolled electrode body, a part of each of an active material layer non-formed portion of the positive electrode sheet 10 and an active material layer non-formed portion of the negative electrode sheet 20 protrudes outward from the rolled core. Moreover, a positive electrode current collecting plate and a negative electrode current collecting plate are attached to the positive electrode-side protruded portion and the positive electrode-side protruded portion respectively, and are respectively electrically connected to the positive electrode terminal 70 (FIG. 3) and the negative electrode terminal 72 (FIG. 3).

<<Positive electrode sheet 10>> As shown in FIG. 4 and FIG. 5, the positive electrode sheet 10 includes a positive electrode current collector 12 typically in a long-strip shape and a positive electrode active material layer 14 formed on one side or on both sides (here, on both sides) of the current collector along a longitudinal direction and containing at least a positive electrode active material. Such a positive electrode sheet 10 may be prepared by applying, to the long-strip shaped positive electrode current collector 12, a pasty or slurry composition (slurry for forming the positive electrode active material layer) which is obtained by dispersing the positive electrode active material and a material used as required in an appropriate solvent, and drying the solvent. As the positive electrode current collector 12, a conductive member containing a metal (aluminum and nickel, for example) having excellent conductivity may be preferably used. Further, as the solvent, any of an aqueous solvent and an organic solvent can be used; for example, N-methyl-2-pyrrolidone (NMP) may be used.

As the positive electrode active material, one or more kinds of various materials known to be used as the positive electrode active material of the non-aqueous electrolyte secondary battery may be used without particular restriction. As preferable examples, layer-system and spinel-system lithium composite metal oxides ($LiNiO_2$, $LiCoO_2$, $LiMn_2O_4$, $LiFeO_2$ and the like) can be used. Among these, lithium nickel cobalt manganese composite oxide ($LiNi_{1/3}Co_{1/3}Mn_{1/3}O_2$, for example), which contains Li, Ni, Co and Mn as constituent elements and has a layered structure (typically, a layered rock salt structure belonging to a hexagonal system), can preferably be used because this composite oxide has excellent thermal stability and a theoretical energy density higher than other compounds.

Such a compound may be prepared by a conventional well-known method. Specifically, for example, raw material compounds (such as lithium source and transitional metal element source) selected according to the composition of a target positive electrode active material are mixed in a prescribed ratio at first, and then the mixture is fired by an appropriate method and an appropriate device. Next, the obtained fired substance can be appropriately milled, granulated and graded for preparation. The property of the compound is not particularly restricted, e.g., it may be particles (powder) having an average particle diameter of about 20 µm or less (typically 0.1 µm~20 µm, e.g., 3 µm~15 µm, preferably 3 µm~10 µm).

In the positive electrode active material layer 14 used here, in addition to the positive electrode active material, one or more kinds of materials which may be used as constituents of the positive electrode active material layer in a general non-aqueous electrolyte secondary battery may be contained as required. As examples of such materials, a conductive material and a binder may be used. As the conductive material, carbon materials such as various kinds of carbon blacks (typically, acetylene black, Ketjen black), cokes, activated carbon, graphite, carbon fiber, and carbon nanotube, for example, can preferably be used. Further, as the binder, for example, polymer materials such as polyvinylidene fluoride (PVdF) and polyethylene oxide (PEO) can preferably be used.

A ratio of the positive electrode active material in the entire positive electrode active material layer 14 is properly set to about 60% by mass or more (typically, 60% by mass to 99% by mass) and is usually preferable to be about 70% by mass to 95% by mass. When the conductive material is used, a ratio of the conductive material in the entire positive electrode active material layer 14 may be set to about 2% by mass to 20% by mass, for example, and is usually preferable to be about 3% by mass to 10% by mass. When the binder is used, a ratio of the binder in the entire positive electrode active material layer 14 may be set to about 0.5% by mass to 10% by mass, for example, and is usually preferable to be about 1% by mass to 5% by mass.

A mass of the positive electrode active material layer 14 disposed per unit area of the positive electrode current collector 12 may be set to about 5 mg/cm$^2$ to 40 mg/cm$^2$ (typically, 10 mg/cm$^2$ to 20 mg/cm$^2$) per one side of the positive electrode current collector 12. Moreover, in a structure where both sides of the positive electrode current collector 12 have the positive electrode active material layer 14 like in the present embodiment, masses of the positive electrode active material layer 14 disposed on both sides of the positive electrode current collector 12 are preferably set to about the same. Further, the density of the positive electrode active material layer 14 may be set to, for example, about 1.5 g/cm$^3$ to 4 g/cm$^3$ (typically, 1.8 g/cm$^3$ to 3 g/cm$^3$). A thickness of the positive electrode active material layer 14 per one side may be set to, for example, 40 µm or more (typically, 50 µm or more) and 100 µm or less (typically, 80 µm or less). The porosity (void fraction) of the positive electrode active material layer 14 may be typically lower than the porosity of the separator substrate 42 described below and may be the same as the porosity of the porous heat resistance layer 30A described below, for example, and specifically, the porosity may be about 5% by volume to 40% by volume (preferably 20% by volume to 40% by volume), for example. By setting the properties of the positive electrode active material layer 14 in the above range, a desired capacity can be maintained and the battery resistance can be suppressed to be low. Therefore, the output characteristics and the energy density of the non-aqueous electrolyte secondary battery can be combined at a high level. The thickness and/or density and porosity of the positive electrode active material layer 14 can be adjusted by applying a proper press process after drying the positive electrode active material slurry, for example.

<<Separator sheet 40>> As shown in FIG. 4 and FIG. 5, the separator sheet 40 has a typically long-strip shaped separator substrate 42 and a porous heat resistance layer 30A formed on one side of the substrate along a longitudinal direction and containing at least an inorganic filler. Such a separator sheet 40 may be preferably prepared by applying, to the long-strip shaped separator substrate 42, a pasty or slurry composition (slurry coated on the separator for forming the first heat resistance layer) which is obtained by dispersing the inorganic filler and a material used as required in an appropriate solvent, and drying the solvent to thereby form the porous heat resistance layer 30A. As the solvent, any of an aqueous solvent and an organic solvent can be used; for example, water may be used.

As a material for forming the separator substrate 42, any material that can insulate the positive electrode active material layer 14 from the negative electrode active material layer 24 and has a function of holding the non-aqueous electrolyte and the shut-down function can be used. Preferable examples thereof include porous resin sheets (films) containing resins such as polyethylene (PE), polypropylene (PP), polyester, cellulose, and polyamide. Among these, polyolefin porous resin sheets (for example, PE or PP) has the shut-down temperatures of 80° C. to 140° C. (typically, 110° C. to 140° C., for example 120° C. to 135° C.), which is sufficiently lower than the heat resistance temperature of the battery (typically, about 200° C. or higher), and therefore can provide the shut-down function at a proper timing.

As the porous resin sheet, for example, a uniaxially-stretched or biaxially-stretched porous resin sheet may be preferably used. Among these, a porous resin sheet which is uniaxially stretched in a longitudinal direction has appropriate strength and little thermal contraction in a width direction, and therefore a shape change such as curl can hardly occur. Therefore, when the sheet like this is used as the separator substrate 42, in the rolled electrode body 80 having a form as shown in FIG. 4, thermal contraction in a longitudinal direction can be well suppressed. Furthermore, the porous resin sheet may contain additives such as various kinds of plasticizers and antioxidants, as required.

The porosity (void fraction) of the separator substrate 42 of the present embodiment is not particularly restricted; e.g., it may be 40% by volume or more and 80% by volume or less (typically 50% by volume or more and 80% by volume or less, e.g., 70% by volume or more and 80% by volume or less). If the porosity of the separator substrate 42 is excessively small, then in the case where a foreign matter (typically, a metallic foreign matter) is present on an electrode surface, for example, the separator may be broken by this foreign matter and the internal short circuit occurs. By setting the porosity of the separator substrate 42 to 40% by volume or more (preferably 50% by volume or more), even in a case that a foreign matter having a tip R (or diameter Φ) of about 30 µm to 50 µm, for example, is present inside a battery (typically, inside an electrode body), the separator substrate 42 can bend to allow proper reduction in a stress which may be applied to the foreign matter, and thus the breakage of the separator can be suppressed. Further, the ion permeability can be well ensured and the battery resistance can be restrained at a low level. In addition, by increasing an amount of the non-aqueous electrolyte that can be held by the separator substrate 42, the battery performance (e.g., input/output characteristics) can be improved. On the other hand, if the porosity of the separator is excessively large, the mechanical strength may become insufficient, and thermal contraction may become obvious. By setting the porosity of the separator substrate 42 to 80% by volume or less, excellent mechanical strength can be exerted, and the insulation between the positive electrode and negative electrode may be properly maintained. In addition, the porosity of the separator substrate 42 can be adjusted according to kinds of constituent materials and strength during stretching, for example.

The aforementioned "porosity" can be obtained from mass W (g), apparent volume V (cm$^3$), and true density $\rho$ (g/cm$^3$) through a formula $(1-W/\rho V) \times 100$. The above "apparent volume" can be calculated by a product of a plan-view area S (cm$^2$) and a thickness T (cm). The "plan-view area S" may be obtained, e.g., by cutting the separator into a square or rectangle via a punch, a cutter, or the like. The "thickness T" may be measured, for example, by means of a micrometer, a thickness meter (e.g., a rotary vernier caliper) or the like. Additionally, the above "true density $\rho$" may be measured by density metrical devices such as a general constant volume expansion method (a gas replacement type bottle method).

The thickness of the separator substrate 42 is not particularly restricted, and is usually preferable to be 10 μm or more (typically, 15 μm or more, for example 17 μm or more) and 40 μm or less (typically 30 μm or less). By setting the thickness of the separator sheet in the above range, the ion permeability of the separator becomes higher, and even when the foreign matter enters the battery, the internal short circuit (breakage of the separator) is then further less likely to occur. The thickness of the separator can be obtained by other measurement means such as that using a micrometer and a thickness meter than the observation using an electron microscope described above.

The air permeability (Gurley number) of the separator substrate 42 is not particularly restricted, and is usually preferable to be 100 sec/100 mL or more (typically, 200 sec/100 mL or more) and 1000 sec/100 mL or less (typically, 600 sec/100 mL or less). The air permeability defines an average pore diameter in a pseudo manner, and if the air permeability is excessively small, there may be a tendency that the ion permeability decreases and the input/output characteristic degrades. If the air permeability is excessively large, then in the case that the porous heat resistance layer 30A is formed on the separator substrate 42, for example, the inorganic filler contained in the porous heat resistance layer excessively intrudes in pores of the separator substrate 42 and there may be decreasing tendencies of the ion permeability and the input/output characteristics. The "permeability" herein means air permeability resistance (Gurley) and can be measured according to a method defined by JIS P8117 (2009).

The separator substrate 42 may have, for example, a single-layer structure as shown in FIG. 5, or a structure in which two or more kinds of porous resin sheets that are different in materials and properties (thickness, porosity, and so forth) are stacked. In one preferable embodiment, a separator sheet having a three-layer structure in which a polypropylene (PP) layer is stacked on both sides of a polyethylene (PE) layer may be adopted. Furthermore, in a case that a separator sheet having a structure in which two or more kinds of porous resin sheets having different porosities are stacked is used, stacking may be carried out such that in the above porosity range, the porosity on a side close to the porous heat resistance layer 30A may be smaller. According to such aspect, the effect of the present invention can be exerted at a higher level. Further, for two separator substrates 42 possessed by the rolled electrode body 80, separator substrates different in material and property from each other may be adopted.

The porous heat resistance layer 30A may have such a property that even when the inside of the battery is heated to a high temperature (for example 150° C. or more, typically 200° C. or more) due to internal short circuit, for example, the porous heat resistance layer 30A is not softened or molten and may maintain a shape thereof (some deformation may be permitted). In the present embodiment, the porous heat resistance layer 30A is provided on a surface of the separator substrate 42 whiling facing the positive electrode sheet 10 (the positive electrode active material layer 14). When a battery is produced (mainly when the positive electrode active material layer is formed), a metallic foreign matter such as copper or iron may enter the battery from the outside (constituent members of a production device, for example). The metallic foreign matter entering the battery may possibly break the separator physically. However, according to the structure of the present embodiment, occurrence of the internal short circuit caused by the metallic foreign matter can be well suppressed, as described above.

A thickness of the porous heat resistance layer 30A is not particularly restricted, as long as it satisfies the above condition (i.e., an average thickness of the porous heat resistance layer 30A is greater than an average thickness of the porous heat resistance layer 30B), and is usually 1 μm or more, and preferably 2 μm or more, for example (typically 4 μm or more, in particular 5 μm or more). By setting the thickness of the porous heat resistance layer 30A to 1 μm or more, the internal short circuit can be well prevented from occurring, and a high short circuit prevention effect may be exerted. Further, by setting the thickness of the porous heat resistance layer 30A to 2 μm or more, when the separator is shut-down (molten), the invasion of the melt thereof into the pores of the positive electrode active material layer can be well suppressed. The upper limit is not particularly restricted, and it is usually equal to or thinner than the thickness of the separator substrate 42, in particular is 30 μm or less, for example, and is more preferable to be 20 μm or less, for example (typically 17 μm or less, in particular 15 μm or less). In a case that the above range is satisfied, excellent battery performance and reliability (resistance against the foreign matter which may be contained in the battery) can be combined at a higher level, and the effect of the present invention can be exerted at a higher level.

The porosity of the porous heat resistance layer 30A is not particularly restricted, and it may be 20% by volume or more and 80% by volume or less, for example (typically 20% by volume or more and 60% by volume or less, preferably 20% by volume or more and 50% by volume or less). If the porosity of the porous heat resistance layer 30A is excessively large, the mechanical strength may be insufficient. Further, if the porosity is excessively small, the ion permeability may decrease, resulting in an increase in the resistance and in a decrease in the input/output characteristics. By setting the porosity in the above range, the effect of the present invention can be exerted at a higher level. Further, the porosity of the porous heat resistance layer 30A can be adjusted according to, for example, constituent materials and/or a blending ratio thereof, a coating method, a drying method, and so on. Furthermore, the ratio of the porosity of the porous heat resistance layer 30A to the porosity of the separator substrate 42 can be set to 0.3 or more and 0.6 or less (preferably 0.3 or more and 0.4 or less), for example. When the above range is satisfied, the separator substrate 42 and the porous heat resistance layer 30A may cooperatively work like a buffer material against the foreign matter on the surface of the positive electrode. That is, the separator substrate 42 having a high porosity and the porous heat resistance layer 30A having the porosity lower than that of the separator may cooperatively disperse and reduce, in a stepwise manner, a stress that may be applied to the foreign matter in the battery, and penetration of the foreign matter through the separator may be properly suppressed.

The porous heat resistance layer 30A of the present embodiment includes at least an inorganic filler. The inorganic filler is not particularly restricted, and for example, one or more kinds can be used among aluminum compounds such as alumina (aluminum oxide: $Al_2O_3$), and alumina hydrate (boehmite ($Al_2O_3 \cdot H_2O$), for example); inorganic oxides such as magnesia (magnesium oxide: MgO), silica (silicon oxide: $SiO_2$), titania (titanium oxide: $TiO_2$), zirconia (zirconium dioxide: $ZrO_2$), and barium titanate ($BaTiO_3$); inorganic nitrides such as silicon nitride ($Si_3N_4$) and aluminum nitride (AlN); inorganic carbides such as silicon carbide (SiC); and element-based materials such as carbon (C), silicon (Si), aluminum (Al), and iron (Fe). Among these, aluminum compounds, magnesia, silica, titania and zirconia may preferably be used, and alumina, boehmite and magnesia may be particularly preferably adopted. These compounds have a high melting point and are excellent in the heat resistance. Further, these compounds have relatively high Mohs hardness and are excellent also in the endurance (mechanical strength). Further, since these compounds are relatively cheap, raw material cost can be saved.

A form of the inorganic filler is not particularly restricted and may be particulate, fiber, plate (flake form), for example. The average particle diameter $D_a$ of the inorganic filler is not particularly restricted as long as it satisfies the above condition (i.e., an average particle diameter $D_a$ of the inorganic filler contained in the porous heat resistance layer 30A is greater than an average particle diameter $D_b$ of the inorganic filler contained in the porous heat resistance layer 30B), and it is typically 5 μm or less, for example 2 μm or less, preferably 1 μm or less, more preferably 0.5 μm or less, in consideration of dispersibility or the like. The lower limit of the average particle diameter $D_a$ is not particularly restricted, and it may usually be 0.001 μm or more, typically 0.005 μm or more, in consideration of operability or the like. By setting the average particle diameter $D_a$ of the inorganic filler in the above ranges, the effect of the present invention may be exerted at a higher level. The particle diameter of the inorganic filler can be adjusted by a method such as milling or sieving. In addition, other than the above method of using the electron microscope as described above, for example, a value of a particle diameter ($D_{50}$ particle diameter, also known as a median diameter) corresponding to a cumulative volume of 50% from fine particle side in a particle size distribution based on volume measured by a particle size distribution measurement based on a general laser diffraction•light scattering method, may be used as the average particle diameter.

A specific surface area of the inorganic filler is not particularly restricted, and is preferably about 1 $m^2/g$~100 $m^2/g$ (for example 1.5 $m^2/g$~50 $m^2/g$, typically 5 $m^2/g$~20 $m^2/g$). As the "specific surface area" here, a BET specific surface area is adopted.

The porous heat resistance layer 30A may contain, in addition to the inorganic filler described above, one or more kinds of materials that may be used as constituents of the porous heat resistance layer in a general non-aqueous electrolyte secondary battery. As examples of such materials, a binder and various kinds of additives can be used. As the binder, other than the material that may be contained in a forming composition of the positive electrode active material layer or negative electrode active material layer, one or more kinds of materials may be selected and used from, for example, rubbers containing acrylonitrile as a copolymerizing component such as acrylonitrile-butadiene copolymer rubber (NBR), acrylonitrile-isoprene copolymer rubber (NIR), and acrylonitrile-butadiene-isoprene copolymer rubber (NBIR); acrylic acid-based polymers containing acrylic acid, methacrylic acid, acrylic ester or methacrylic ester as a main copolymerizing component; polyolefin-based polymer such as polyethylene (PE); fluorinated polymers such as polytetrafluoroethylene (PTFE); and cellulose-based polymers such as carboxymethyl cellulose (CMC) and methyl cellulose (MC). Among these, acrylic acid-based polymers with an acrylic resin as a base have a strong binding force and also are electrochemically stable and are thus preferable. Other than the above, various kinds of additives such as a viscosity increaser and a dispersant may properly be used.

It is appropriate to set a ratio of the inorganic filler contained in the entire porous heat resistance layer 30A to about 50% by mass or more, usually preferably as 85% by mass to 99.8% by mass (90% by mass to 99% by mass, for example). In a case that the binder is used, a ratio of the binder in the entire porous heat resistance layer 30A may the generally set to about 1% by mass to 10% by mass, usually preferably to about 1% by mass to 5% by mass.

The porous heat resistance layer 30A may have, for example, a single-layer structure as shown in FIG. 5, or a structure having two or more layers that are different in kinds and/or ratios of the inorganic fillers contained, thicknesses and/or porosities, and so forth. For example, in the case of a structure having two or more layers different in porosities, the layers may be stacked such that the porosity on a side close to the separator substrate 42 becomes higher. According to this embodiment, the effect of the present invention can be exerted at a further higher level. Further, in the two separator sheets 40 included in the rolled electrode body 80, the separator substrates 42 may be same or different.

<<Negative electrode sheet 20>> As shown in FIG. 4 and FIG. 5, the negative electrode sheet 20 includes: a negative electrode current collector 22 typically in a long-strip shape; a negative electrode active material layer 24 formed on one side or on both sides (here, on both sides) of the current collector along a longitudinal direction and containing at least a negative electrode active material; and a porous heat resistance layer 30B formed on a surface of the negative electrode active material layer 24 along the longitudinal direction. The porous heat resistance layer 30A and 30B, which are disposed on both sides of the separator substrate 42 made of resin respectively, may well disperse and reduce stress which may be applied to the invading foreign matter, and may prevent the foreign matter from penetrating through the separator. In addition, by providing the porous heat resistance layer 30B on the surface of the negative electrode active material layer 24, an extremely thin non-aqueous electrolyte layer may be disposed between the separator substrate 42 and the porous heat resistance layer 30B, suppressing the deformation of the negative electrode.

When such negative electrode sheet 20 is prepared, the negative electrode active material layer 24 is formed by at first applying, to the long-strip shaped negative electrode current collector 22, a pasty or slurry composition (slurry for forming the negative electrode active material layer) which is obtained by dispersing a negative electrode active material and a material used as required in a proper solvent, and drying the solvent. Next, the porous heat resistance layer 30B is formed by applying, to the surface of the negative electrode active material layer 24, a pasty or slurry composition (slurry for forming a second heat resistance layer coated on the negative electrode) which is obtained by dispersing the inorganic filler and a material used as required in a proper solvent, and drying the solvent. Thereby, the negative electrode sheet 20 can be well prepared. As the negative electrode current collector 22, a conductive material containing a metal (for example, copper, nickel) having excellent conductivity may preferably be used. As the solvent, any of an aqueous solvent and an organic solvent can be used; for example, water may be used.

As the negative electrode active material, one or more kinds of various materials that are known to be used as a negative electrode active material of a non-aqueous electrolyte secondary battery may be used without particular restriction. Preferable examples include graphite, hardly graphitizable carbon (hard carbon), easily graphitizable carbon (soft carbon), carbon nanotubes, and carbon materials that contain a graphite structure (layered structure) in at least a portion of a material having combined structures of these. Among these, graphite-based materials (typically, graphite) may preferably be used because a high energy density can be obtained. The property of the negative electrode active material is not particularly restricted, for example, it may be particles (powder) having an average particle diameter of about 0.5 μm~20 μm, typically 1 μm~15 μm, e.g., 4 μm~10 μm).

The negative electrode active material layer 24 used here may contain one or more kinds of materials that may be used as constituents of the negative electrode active material layer in the general non-aqueous electrolyte secondary battery, as required. As examples of such materials, a binder and various kinds of additives can be used. As the binder, for example, polymer materials such as styrene butadiene rubber (SBR) and polyvinylidene fluoride (PVdF) can preferably be used. Other than the above, various kinds of additives such as a viscosity increaser, a dispersant and a conductive agent can be properly used; for example, as the viscosity increaser, carboxymethyl cellulose (CMC) and methyl cellulose (MC) can preferably be used.

It is appropriate to set a ratio of the negative electrode active material in the entire negative electrode active material layer 24 to about 50% by mass or more and usually preferably to 90% by mass to 99% by mass (95% by mass to 99% by mass, for example). When the binder is used, a ratio of the binder in the entire negative electrode active material layer 24 may be set to about 1% by mass to 10% by mass, for example, and usually preferably may be set to about 1% by mass to 5% by mass.

A mass of the negative electrode active material layer 24 disposed on per unit area of the negative electrode current collector 22 may be set to about 5 mg/cm$^2$ to 20 mg/cm$^2$ (typically 7 mg/cm$^2$ to 15 mg/cm$^2$) per one side of the negative electrode current collector 22. In a structure that has the negative electrode active material layer 24 on both sides of the negative electrode current collector 22 like this embodiment, masses of the negative electrode active material layers 24 disposed on both sides of the negative electrode current collector 22 are preferably set to substantially the same. In addition, the density of the negative electrode active material layer 24 may be set to about 0.5 g/cm$^3$ to 2 g/cm$^3$ (typically, 1 g/cm$^3$ to 1.5 g/cm$^3$), for example. A thickness of the negative electrode active material layer 24 on each side may be set to 40 μm or more (typically, 50 μm or more) and 100 μm or less (typically, 80 μm or less). The porosity (void fraction) of the negative electrode active material layer 24 is typically smaller than the porosity of the separator substrate 42, may be the same as the porosity of the porous heat resistance layer 30B described below, and for example, may be set to about 5% by volume to 50% by volume (preferably, 35% by volume to 50% by volume). When the properties of the negative electrode active material layer are set in the above range, an interface with a non-aqueous electrolyte can be properly maintained, and the endurance (cycle characteristic) and output characteristic can be combined at a high level. Further, thickness and/or density, and porosity of the negative electrode active material layer 24 can be adjusted by applying a proper press process in the same manner as the positive electrode active material layer 14 described above.

In the same manner as the porous heat resistance layer 30A, the porous heat resistance layer 30B may have such a property that even when the inside of the battery is heated to a high temperature (for example 150° C. or more, typically 200° C. or more) due to internal short circuit, for example, the porous heat resistance layer 30B is not softened or molten and may maintain a shape thereof (a slight deformation may be permitted). In the battery of the present embodiment, the porous heat resistance layer 30B is provided on a surface of the negative electrode active material layer 24. Therefore, for example, even in a case that the negative electrode is slightly warped and bended due to the stress caused by the above foreign matter within the battery, collapse of the negative electrode active material layer 24 and/or peeling of the negative electrode active material from the negative electrode active material layer can also be well suppressed.

A thickness of the porous heat resistance layer 30B is not particularly restricted as long as it satisfies the above condition (i.e., an average thickness of the porous heat resistance layer 30A is greater than an average thickness of the porous heat resistance layer 30B). However, in view of operability or the like, the thickness is usually 0.2 μm or more, and preferably 0.4 μm or more, for example (typically 0.6 μm or more, in particular 1 μm or more.). By setting the thickness of the porous heat resistance layer 30B to 0.2 μm or more, deformation of the negative electrode may be well suppressed, and high mechanical strength and endurance may be exerted. An upper limit is not particularly restricted, is usually thinner than the negative electrode active material layer 24, and in particular is e.g., 10 μm or less, preferably 9 μm or less (typically 6 μm or less). In a case that the above range is satisfied, excellent battery performance and reliability (endurance) can be combined at a higher level, and the effect of the present invention can be exerted at a further higher level.

A ratio ($T_b/T_a$) of the average thickness $T_b$ of the porous heat resistance layer 30B to the average thickness $T_a$ of the porous heat resistance layer 30A may be 0.15 or more and 0.25 or less (typically 0.2 or more and 0.3 or less). With this configuration, the internal short circuit caused by invasion of the foreign matter into the battery can be suppressed at a higher level. Even if a sharp foreign matter, for example, with a tip R (or diameter Φ) of 30 μm or less (typically 15 μm~30 μm) enters into the battery, the internal short circuit and the peeling (slipping) of the negative active material are difficult to occur, and improved endurance may be exerted. Hence, the effect of the present invention can be further exerted.

The porosity of the porous heat resistance layer 30B is not particularly restricted, e.g., it may be equal to the porosity of the porous heat resistance layer 30A, and in particular may be 20% by volume or more and 80% by volume or less (typically 20% by volume or more and 60% by volume or less, for example 20% by volume or more and 50% by volume or less). If the porosity of the porous heat resistance layer 30B is excessively large, the mechanical strength may be insufficient. Further, if the porosity is excessively small, the ion permeability may decrease, resulting in an increase in the resistance and in a decrease in the input/output characteristics. By setting the porosity in the above ranges, the effect of the present invention can be exerted at a higher level. Additionally, the porosity of the porous heat resistance layer 30B can be adjusted according to for example, a constituent material and/or a mixing ratio thereof, a coating method, a drying method, and the like.

The porous heat resistance layer 30B of the present embodiment includes at least an inorganic filler. The inorganic filler is not particularly restricted, and for example, one or more kinds of materials can be suitably used among those illustrated materials for forming the above porous heat resistance layer 30A. A form of the inorganic filler is not particularly restricted, and may be, for example, particulate, fiber, plate (flake form) and the like. A specific surface area of the inorganic filler is not particularly restricted, and preferably is about 1 m$^2$/g~100 m$^2$/g (e.g., 1.5 m$^2$/g~50 m$^2$/g, typically 5 m$^2$/g~20 m$^2$/g). An average particle diameter $D_b$ of the inorganic filler is not particularly restricted, as long as it satisfies the above condition (i.e., an average particle diameter $D_a$ of the inorganic filler contained in the porous heat resistance layer 30A is larger than an average particle diameter $D_b$ of the inorganic filler contained in the porous heat resistance layer 30B), and is typically 2 μm or less, for example 1 μm or less, preferably 0.75 μm or less, further preferably 0.5 μm or less, in consideration of dispersibility or the like. A lower limit is not particularly restricted, and may usually be 0.001 μm or more, typically 0.005 μm or more, in consideration of operability or the like.

In one preferable aspect, a ratio ($D_b/D_a$) of the average particle diameter $D_b$ of the inorganic filler contained in the porous heat resistance layer 30B to the average particle diameter $D_a$ of the inorganic filler contained in the porous heat resistance layer 30A is 0.1 or more and 0.5 or less. With this configuration, the stress which may be applied to the foreign matter may be further dispersed and reduced, and the deformation of the negative electrode may be well suppressed. Hence, the effect of the present invention can be exerted at a higher level.

In addition, in the same manner as the porous heat resistance layer 30A, the porous heat resistance layer 30B may contain, in addition to the inorganic filler described above, other components (typically binder and viscosity increaser) as required. The ratios of the inorganic filler and binder contained in the entire porous heat resistance layer 30B may be the same as that in the porous heat resistance layer 30A. Additionally, the porous heat resistance layer 30B may be a single-layer structure as shown in FIG. 5, or may be a structure having two or more layers that are different in kinds and/or ratios of the inorganic fillers contained, thicknesses and/or porosities, and so forth.

<<Battery case 50>> As the material of the battery case 50, for example, metal materials such as aluminum and steel; resin materials such as a polyphenylene sulfide resin and a polyimide resin can be used. Among these, from the viewpoint of improving the heat dissipation property and energy density, relatively lightweight metals (such as aluminum and aluminum alloys) may preferably be adopted. Further, a shape of the case (an external shape of the container) may be, for example, a circle (cylinder, coin, and button), a hexahedron (rectangular parallelepiped and cube), a bag-shape and shapes obtained by processing and modifying these.

<<Non-aqueous electrolyte>> As the non-aqueous electrolyte, a material in which a support electrolyte (e.g., lithium salt, sodium salt, magnesium salt, and the like; lithium salt in the lithium ion secondary battery) is dissolved or dispersed in a non-aqueous solvent may be preferably used. Alternatively, the non-aqueous electrolyte may be a solid (typically, so-called gel) material obtained by adding a polymer in a liquid non-aqueous electrolyte. As the support electrolyte, the same as that of the general non-aqueous electrolyte secondary battery can be appropriately selected and adopted, and, lithium salts such as LiPF$_6$, LiBF$_4$, LiClO$_4$, LiAsF$_6$, Li(CF$_3$SO$_2$)$_2$N, and LiCF$_3$SO$_3$ may be used. Such a support electrolyte may be used alone or in a combination of two or more kinds thereof. As a particularly preferable support electrolyte, LiPF$_6$ can be used. Further, the non-aqueous electrolyte is preferably prepared such that a concentration of the support electrolyte may be in a range of 0.7 mol/L to 1.3 mol/L.

As the non-aqueous solvent, organic solvents such as various kinds of carbonates, ethers, esters, nitriles, sulfones, and lactones which are used as the non-aqueous electrolyte solution in the general non-aqueous electrolyte secondary battery can be used without limitation. Specific examples thereof include ethylene carbonate (EC), propylene carbonate (PC), diethyl carbonate (DEC), dimethyl carbonate (DMC), and ethyl methyl carbonate (EMC), and the like. Such a non-aqueous solvent can be used alone or in an appropriate combination of two or more kinds thereof. Further, in the non-aqueous electrolyte, as long as an object of the present invention is not largely damaged, various kinds of additives can be properly added. The additives may be used for one or more objects of improving output performance of the battery, improving storage stability (prevention of capacity decrease during storage), improving cycle characteristics and improving initial charge/discharge efficiency and the like. Preferable examples of the additives include fluorophosphates (typically, difluorophosphate, for example, lithium difluorophosphate), lithium bis oxalato borate (LiBOB), vinylene carbonate (VC), and fluoroethylene carbonate (FEC), etc.

The non-aqueous electrolyte secondary battery of the present embodiment can be used in various applications and is characterized in that high battery performance and reliability (resistance against the foreign matter in the battery) are combined. Therefore, the non-aqueous electrolyte secondary battery can preferably be used in applications where high energy density and input/output density are required or in applications where high reliability is required. An example of such applications may be a driving source (driving power source) for a motor installed in a vehicle. The kind of the vehicle is not particularly restricted, and the examples include a plug-in hybrid vehicle (PHV), a hybrid vehicle (HV), an electric vehicle (EV), an electric truck, an electric bicycle, an electric assisted bicycle, an electric wheel chair, an electric train, and the like. Such non-aqueous electrolyte secondary batteries may be used in a form of pack battery where a plurality of the batteries are connected in series and/or in parallel.

Hereinafter, as specific examples, whether there is a difference in reliability (resistance against the invading foreign matter) between batteries corresponding to structures disclosed here or not was studied. It is not intended to restrict the present invention to the specific examples like these.

I. Study Relating to $T_b/T_a$ (Examples 1 to 6)

<Preparation of a positive electrode> First, by mixing LiNi$_{1/3}$Co$_{1/3}$Mn$_{1/3}$O$_2$ powder (hereinafter, sometimes simply referred to as "LNCM") as the positive electrode active material, polyvinylidene fluoride (PVdF) as the binder, and acetylene black (AB) as the conductive material with N-methylpyrrolidone (NMP) such that a mass ratio of these materials may be LNCM:PVdF:AB=94:3:3 and a solid content concentration may be about 60% by mass, a slurry composition for forming the positive electrode active material layer (positive electrode active material slurry) was prepared. The positive electrode active material slurry was coated in a belt shape on one side of a long-strip shaped aluminum foil (positive electrode current collector) having a thickness of about 15 μm by a roller coat method and was dried (drying temperature: 120° C., for 1 minute) such that a weight per unit area became 10 mg/cm$^2$ (solid content base), and a positive electrode active material layer having a thickness of about 65 μm was thereby formed. This was rolled with a roll press, and a positive electrode sheet (total thickness: 80 μm) was obtained.

<Preparation of a separator> First, a first heat resistance layer forming slurry was prepared. Specifically, by mixing alumina (average particle diameter: 0.5 μm) as the inorganic filler, styrene butadiene rubber (SBR) as the binder, and carboxymethyl cellulose (CMC) as the viscosity increaser with ion exchange water such that a mass ratio of these materials was alumina:SBR:CMC=97:2:1, a slurry composition for forming the heat resistance layer (a first heat resistance layer forming slurry) was prepared. When such a slurry was prepared, using an ultrasonic disperser (manufactured by M Technique Co., Ltd., CLEARMIX), mixing and kneading as pre-dispersion was conducted under the condition of 15,000 rpm for 5 minutes, and mixing and kneading as true dispersion was conducted under the condition of 20,000 rpm and for 15 minutes.

Next, on one side of the separator substrate (here, a single-layer structure made of polyethylene (PE) using a material having an average thickness of 30 μm, a porosity of 70% and a shut-down temperature (softening temperature of PE) of 128° C.), the above-prepared heat resistance layer forming slurry was coated by a general gravure coating method. In the coating, a gravure roll having the number of gravure lines: #100 lines/inch, and an ink retaining amount: 19.5 ml/cm$^2$ was used, and the coating condition was set to the coating speed of 3 m/minute, gravure roll speed of 3.8 m/minute, and gravure speed/coating speed ratio of 1.27. The separator after coating was dried to form a porous heat resistance layer 30A having an average thickness of 15 μm and a porosity of 35%, and a separator sheet (with a total thickness of 45 μm) was prepared by sequentially stacking the separator substrate and the porous heat resistance layer 30A.

<Manufacture of a negative electrode> First, by mixing natural graphite powder as the negative electrode active material (C, average particle diameter: 5 μm; specific surface area: 3 m$^2$/g), styrene butadiene rubber (SBR) as the binder and carboxymethyl cellulose (CMC) as the viscosity increaser with ion exchange water such that a mass ratio of these materials was C:SBR:CMC=98:1:1 and a solid content concentration was about 45% by mass, a slurry composition for forming the negative electrode active material layer (negative electrode active material slurry) was prepared. Then, the negative electrode active material slurry was coated in a belt shape on one side of a long-strip shaped copper foil (negative electrode current collector) having a thickness of about 10 μm by a roller coat method and dried (drying temperature: 120° C., 1 minute) such that a weight per unit area became 7 mg/cm$^2$ (solid content base), and thus a negative electrode active material layer having a thickness of about 80 μm was formed. This was rolled by a roller press, obtaining a negative electrode sheet (total thickness: 90 μm) including a negative electrode current collector and a negative electrode active material layer according to Example 1.

Next, in the same manner as the first heat resistance layer forming slurry, a second heat resistance layer forming slurry coated on the negative electrode was prepared. The second heat resistance layer forming slurry was coated on a surface of the negative electrode sheet according to the above Example 1 by a general gravure coating method. Furthermore, the coating method and condition were the same as above. The coated negative electrode was dried to form a porous heat resistance layer 30B having an average thickness and porosity as shown in Examples 2 to 6 in the following Table 1, and the negative electrode sheets (Examples 2 to 6) were prepared by sequentially stacking the negative electrode current collector, the negative electrode active material layer and the porous heat resistance layer 30B.

<Manufacture of an electrode body> To each of uncoated parts of the above-obtained positive electrode sheet and negative electrode sheet, a seal lead (terminal) which is made of a metal of the same kind as the current collector was attached. Then the positive electrode sheet and the negative electrode sheet were disposed to face each other through the separator sheet and an electrode body was prepared. Furthermore, the porous heat resistance layer 30A was disposed while facing the positive electrode, and the porous heat resistance layer 30B was disposed while facing the separator. The electrode body was housed in a laminated film (batter case), and a non-aqueous electrolyte (here non-aqueous electrolyte solution) was poured from an opening. As the non-aqueous electrolyte solution, a non-aqueous electrolyte solution obtained by dissolving LiPF$_6$ as the support electrolyte in a concentration of 1 mol/L in a mixed solvent containing ethylene carbonate (EC), dimethyl carbonate (DMC) and methyl ethyl carbonate (EMC) at a volume ratio of EC:DMC:EMC=3:3:4 was used. Thereafter, while vacuuming, by thermally welding the laminated film and a sealing part of the lead to hermetically seal the opening, and thereby non-aqueous electrolyte secondary batteries according to Example 1 to Example 6 were formed. Relevant properties of the porous heat resistance layers of the batteries are summarized in Table 1. The non-aqueous electrolyte secondary batteries according to Example 1 to Example 6 are different from each other only in the thickness of the porous heat resistance layer 30B contained in the negative electrode.

TABLE 1

| | Separator Porous heat resistance layer 30A | | | Negative electrode Porous heat resistance layer 30B | | | | | Tip R of foreign matter (μm) |
|---|---|---|---|---|---|---|---|---|---|
| | Thickness $T_a$ (μm) | Porosity (Vol %) | Particle diameter $D_a$ (μm) | Thickness $T_b$ (μm) | Porosity (Vol %) | Particle diameter $D_b$ (μm) | $T_b/T_a$ | $D_b/D_a$ | |
| Example 1 | 15 | 35 | 0.5 | 0 | — | — | — | — | 27 |
| Example 2 | | | | 1.5 | 35 | 0.5 | 0.1 | 1 | 26 |
| Example 3 | | | | 3.0 | | | 0.2 | | 19 |
| Example 4 | | | | 4.5 | | | 0.3 | | 18 |
| Example 5 | | | | 6.0 | | | 0.4 | | 25 |
| Example 6 | | | | 7.5 | | | 0.5 | | 27 |

<Experiment on short circuit caused by foreign matter> A foreign matter short circuit test was carried out for the above-prepared batteries according to Examples 1 to 6. Specifically, the prepared non-aqueous electrolyte secondary battery was first sandwiched with a SUS (Steel Use Stainless) restraining plate and a clip, and pressure of about 0.1 MPa was loaded on the battery. Then, at a charging rate of ⅕C, charge was conducted up to 4.2 V, and further under constant voltage, charge was conducted to a charging rate of 1/10 of an initial current value. Next, the battery after charge was disassembled in a dry atmosphere, and the electrode body was taken out of the battery case. Inside of the electrode body and on a surface of the negative electrode, a small iron piece as the metallic foreign matter was inserted. A non-aqueous electrolyte secondary battery was formed with this electrode body in the same manner as the above, and then, after the non-aqueous electrolyte secondary battery was again sandwiched with the restraining plate and the clip, and a battery voltage was measured. When the battery voltage decreased by 1 V or more (that is, when decreased to 3.2 V or less), the internal short circuit occurred, and the test was stopped. In addition, as the metallic foreign matter (iron) inserted in the electrode body, a metal having a diameter Φ of 140 μm and a thickness of about 10 μm was used. The shape of the foreign matter was changed gradually such that the tip R of the foreign matter was reduced (became sharp), and the test was repeated until the internal short circuit occurred. The tip R (μm) of the foreign matter when the internal short circuit occurred was shown in a column of "Tip R of foreign matter (μm)" in Table 1 and in FIG. 6.

Figure 6:
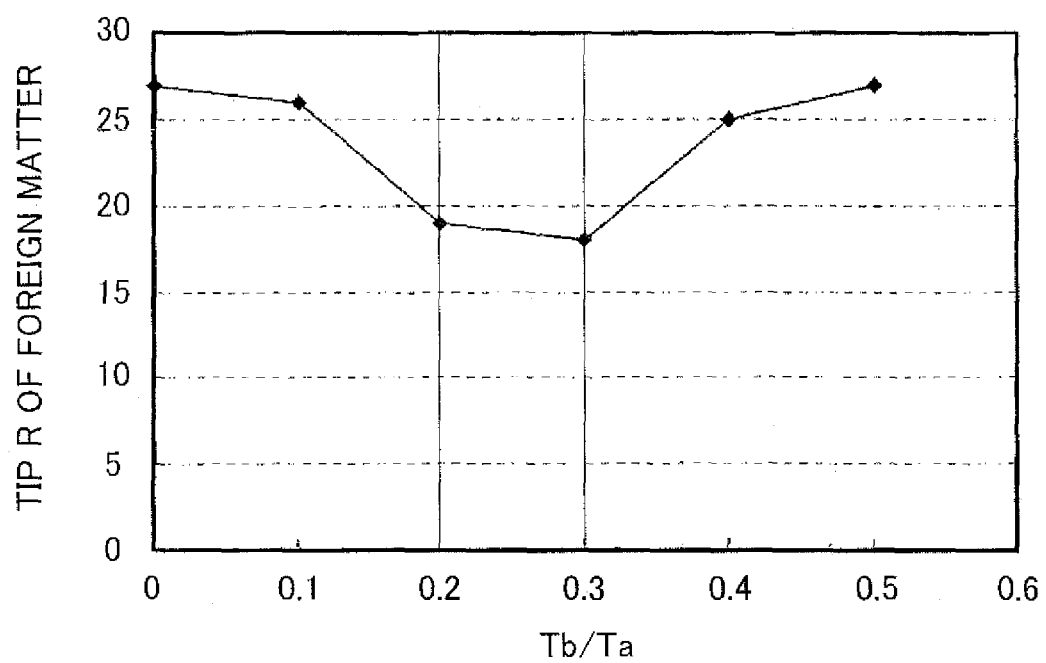
FIG. 6 is a graph showing a relationship between a ratio (Tb/Ta) of average thicknesses of the porous heat resistance layers and a tip R of the foreign matter.

As can be seen from Table 1 and FIG. 6, when $T_b/T_a$ is set to be less than 1 (in other words, the average thickness $T_a$ of the porous heat resistance layer 30A is greater than the average thickness $T_b$ of the porous heat resistance layer 30B), even in a case that a relatively sharp foreign matter (with a tip R of 100 μm or less, for example) is contained in the battery, the internal short circuit may be well suppressed. In particular, it was found that when $T_b/T_a$ is set to 0.2~0.3, even in a case that an extremely sharp-shaped (fine) foreign matter, for example, with a tip R of about 15 μm~25 μm, is contained, the internal short circuit may be well suppressed.

From this, it was shown that when $T_b/T_a$ is set to 0.2~0.3, a battery which has excellent reliability (resistance against foreign matter contamination) and endurance and in which the internal short circuit is further less likely to occur may be achieved.

II. Study Relating to $T_b/T_a$ (Examples 7 to 15)

In the above I., in the formation of the porous heat resistance layers 30A and 30B, the inorganic filler having the average particle diameter as shown in Table 1 was used; besides, non-aqueous electrolyte secondary batteries (Example 7~15) were manufactured in the same manner as Examples 1 to 6. Relevant properties of the porous heat resistance layers of the batteries are summarized in Table 2.

TABLE 2

| | Separator Porous heat resistance layer 30A | | | Negative electrode Porous heat resistance layer 30B | | | | |
|---|---|---|---|---|---|---|---|---|
| | Thickness $T_a$ (μm) | Porosity (Vol %) | Particle diameter $D_a$ (μm) | Thickness $T_b$ (μm) | Porosity (Vol %) | Particle diameter $D_b$ (μm) | $T_b/T_a$ | $D_b/D_a$ |
| Example 7 | 15 | 35 | 0.1 | 4.5 | 35 | 0.01 | 0.3 | 0.1 |
| Example 8 | | | | | | 0.05 | | 0.5 |
| Example 9 | | | | | | 0.1 | | 1.0 |
| Example 10 | | | 0.5 | | | 0.05 | | 0.1 |
| Example 11 | | | | | | 0.25 | | 0.5 |
| Example 12 | | | | | | 1.0 | | 2.0 |
| Example 13 | | | 1.0 | | | 0.1 | | 0.1 |
| Example 14 | | | | | | 0.5 | | 0.5 |
| Example 15 | | | | | | 1.0 | | 1.0 |

<Experiment on short circuit caused by foreign matter> A foreign matter short circuit test was carried out for the above-prepared batteries according to Examples 7 to 15. Specifically, after a voltmeter was connected with terminals of the positive electrode and negative electrode of the prepared battery, the battery was sandwiched by two restraining plates, and a press machine was used to apply gradually increased pressure (load). By recording an applied load and a voltage change between the positive electrode and negative electrode, a load when conductivity was formed between the positive electrode and negative electrode was obtained as "short circuit strength". Results are shown in FIG. 7.

As shown in FIG. 2 and FIG. 7, it was found that when $D_b/D_a$ is set to be less than 1 (in other words, the average particle diameter $D_a$ of the inorganic filler contained in the porous heat resistance layer 30A is greater than the average particle diameter $D_b$ of the inorganic filler contained in the porous heat resistance layer 30B), even in a case that a relatively sharp foreign matter (with a tip R of 100 μm or less, for example) is contained in the battery, the internal short circuit may be well suppressed. In particular, it was found that when $D_b/D_a$ is set to be 0.5 or less (typically 0.1~0.5), a stress applied to a foreign matter entering the battery may further be dispersed and reduced, and the internal short circuit can further properly be prevented from occurring. From this, it was shown that when $D_b/D_a$ is set to 0.1~0.5, a battery that has further higher short circuit strength and is excellent in reliability (resistance against foreign matter contamination) and endurance may be achieved.

Although specific examples of the present invention have been described in detail in the above, these are only exemplifications and are not intended to limit the present invention. The present invention include technologies obtained through various modification and alterations of the specific examples exemplified above.

What is claimed is:

1. A non-aqueous electrolyte secondary battery, comprising:
    an electrode body formed by sequentially stacking a positive electrode, a separator, and a negative electrode; and
    a non-aqueous electrolyte, wherein
    the separator has a separator substrate made of resin and a first porous heat resistance layer, the first porous heat resistance layer containing a first inorganic filler and being formed on a surface of the separator substrate on a side facing the positive electrode,
    a surface of the negative electrode on a side facing the separator is formed by a second porous heat resistance layer containing a second inorganic filler,
    the first and second porous heat resistance layers satisfy following conditions (1) and (2):
        (1) a first average thickness of the first porous heat resistance layer is greater than a second average thickness of the second porous heat resistance layer; and
        (2) a first average particle diameter of the first inorganic filler contained in the first porous heat resistance layer is greater than a second average particle diameter of the second inorganic filler contained in the second porous heat resistance layer, and
    a ratio of the average particle diameter of the inorganic filler contained in the second porous heat resistance layer to the average particle diameter of the inorganic filler contained in the first porous heat resistance layer is 0.1 or more and 0.5 or less and a ratio of the second average thickness of the second porous heat resistance layer to the first average thickness of the first porous heat resistance layer is 0.1 or more and 0.5 or less.

2. The non-aqueous electrolyte secondary battery according to claim 1, wherein
    the first average thickness of the first porous heat resistance layer is 5 μm or more and 15 μm or less.

3. The non-aqueous electrolyte secondary battery according to claim 1, wherein
    the first average particle diameter of the first inorganic filler contained in the first porous heat resistance layer is 0.1 μm or more and 5 μm or less.

4. The non-aqueous electrolyte secondary battery according to claim 1, wherein
    a third average thickness of the separator substrate is 30 μm or less.

5. The non-aqueous electrolyte secondary battery according to claim 1, wherein
    the separator substrate essentially consists of at least of one of polyethene resin or polypropylene resin.

6. The non-aqueous electrolyte secondary battery according to claim 1, wherein
    the first porous heat resistance layer is adhered to the separator substrate;
    the negative electrode comprises a negative electrode current collector and a negative electrode active material layer adhered to the negative electrode current collector;
    the second porous heat resistance layer is adhered to the negative electrode active material layer; and
    the non-aqueous electrolyte secondary battery comprises a non-aqueous electrolyte layer of the non-aqueous electrolyte formed between the second porous heat resistance layer and the separator.

7. The non-aqueous electrolyte secondary battery according to claim 1, wherein a porosity of the first porous heat resistance layer ranges from 20% by volume to 80% by volume.

8. The non-aqueous electrolyte secondary battery according to claim 1, wherein the separator substrate has an air permeability that ranges from 100 sec/100 ml to 1000 sec/100 ml.

9. The non-aqueous electrolyte secondary battery according to claim 1, wherein a specific surface area of the first inorganic filler ranges from 1 $m^2$/g to 100 $m^2$/g.

10. The non-aqueous electrolyte secondary battery according to claim 1, wherein the first average particle diameter of the first inorganic filler contained in the first porous heat resistance layer is in the range of from 0.001 μm to 5 μm.

11. The non-aqueous electrolyte secondary battery according to claim 1, wherein the first porous heat resistance layer is about 3 to about 5 times the average thickness of the second porous heat resistance layer.

12. The non-aqueous electrolyte secondary battery according to claim 1, wherein the inorganic filler contained in the first porous heat resistance layer has an average particle diameter size of about 2 to about 10 times that of the inorganic filler contained in the second porous heat resistance layer.

* * * * *